July 2, 1929.  J. G. KING  1,719,117

REFRIGERATING APPARATUS

Filed Feb. 6, 1926

Inventor
Jesse G. King
By
Spencer Sewall & Hardman
his Attorneys.

Patented July 2, 1929.

1,719,117

UNITED STATES PATENT OFFICE.

JESSE G. KING, OF DAYTON, OHIO, ASSIGNOR, BY MESNE ASSIGNMENTS, TO FRIGIDAIRE CORPORATION, A CORPORATION OF DELAWARE.

REFRIGERATING APPARATUS.

Application filed February 6, 1926. Serial No. 86,590.

This invention relates to cooling units for mechanical refrigerators, especially such units as are adapted to be immersed in the liquid to be cooled thereby.

An object of this invention is to provide an efficient form of cooling unit which may be economically manufactured in various sizes by adding an extension portion to the main portion of the cooling unit which is standard for a number of sizes.

Further objects and advantages of the present invention will be apparent from the following description, reference being had to the accompanying drawings, wherein a preferred form of embodiment of the present invention is clearly shown.

In the drawings.

Similar reference numerals refer to similar parts throughout the several views.

Numeral 10 designates the cylindrical header tank which contains within a suitable form of float valve (not shown) which maintains the liquid refrigerant within tank 10 at a substantially constant level. Liquid refrigerant is led to tank 10 through the duct 11. The vaporized refrigerant is led from said tank through the duct 12 which leads off from the space above the liquid level in tank 10.

Figure 2:
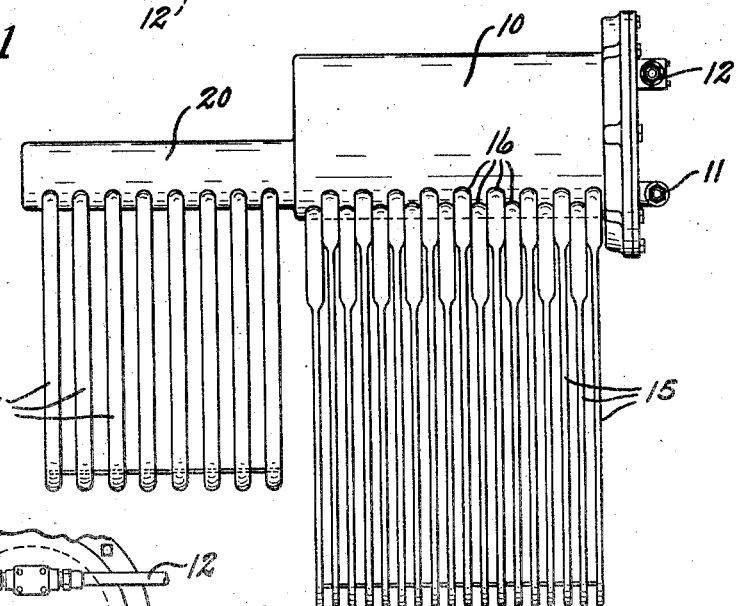
Fig. 2 is a side elevation of a cooling unit built according to this invention.
Figures 3, 4:
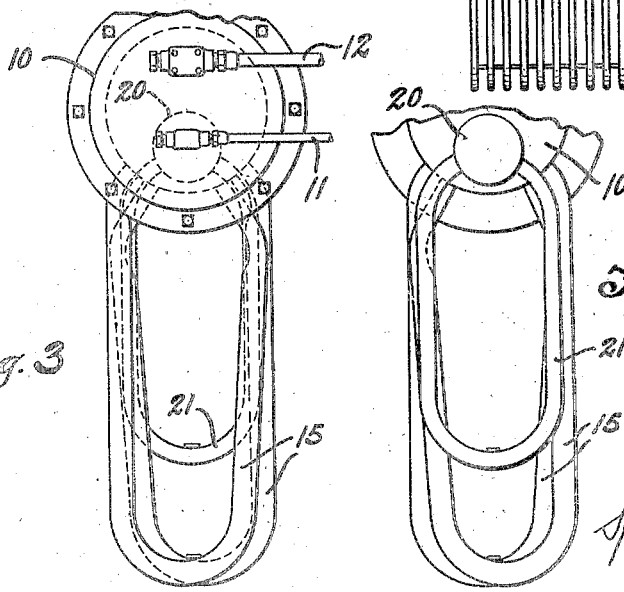
Fig. 3 is a front end elevation thereof.
Fig. 4 is a rear end elevation thereof.

A series of duct loops 15 are connected in parallel to tank 10 below the liquid level therein and depend therebelow into the medium cooled by the cooling unit. The connections 16 of these loops 15 are preferably staggered, as clearly shown in the drawings, in order that the loops may be placed close together longitudinally of the tank 10 and yet permit the connections to be sufficiently spaced to be properly made. These loops 15 are made of seamless copper tubing and hence they may be easily flattened in section (see Fig. 2) so that said loops will be spaced apart longitudinally of tank 10 to permit better circulation therethrough of the liquid cooled thereby. Also the flattening of these tubes gives an increased heat transfer surface per volume of liquid refrigerant therein.

An extension header 20 of very much smaller diameter than tank 10 is rigidly connected to the rear end of the tank by welding or by any other suitable means. This extension 20 is also provided with a series of depending loops 21. In the drawings, these loops 21 are shown somewhat shorter than the loops 15 and spaced further apart, however, if desired, loops 21 may be shaped and spaced similarly to loops 15. The extension header 20 may be made any desired length in order to get the desired amount of cooling surface on the cooling unit. It is thus seen that the float tank 10 can be made only large enough to conveniently accommodate the float valve mechanism while the extension 20 permits the cooling surface of the entire unit to be made as large as desired. Economy in manufacture is thus obtained, especially since a single size of float tank 10 may be used as standard on various sizes of cooling units. The smallest size unit, of course, would be that when extension 20 is omitted entirely.

Figure 1:
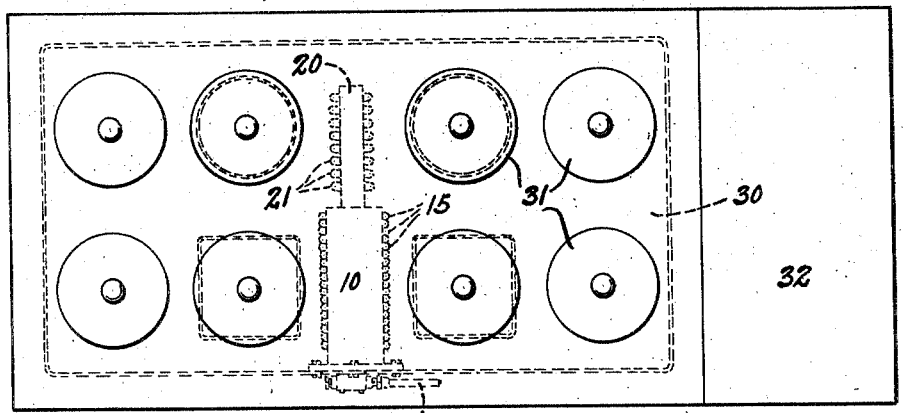
Fig. 1 is a plan view of an ice cream cabinet showing inserted therein a cooling unit built according to this invention.

Fig. 1 illustrates the cooling unit described above immersed in the brine tank 30 of an ice cream cabinet. The ice cream cabinet herein shown is substantially the same as that shown in my copending application Serial No. 702,456, filed March 27, 1924. The brine circulates around and is cooled by cold surface of the cooling unit and thus maintains the eight large ice cream containers or compartments 31 at the desired cold temperature.

It is obvious from the disclosure that the tank 10 and duct loops 15 provide a larger heat exchanging area than the header 20 and loops 21. And, it is apparent that by virture of this construction, that the cooling medium within the tank 30 and adjacent the tank 10 and loops 15 will be maintained at a lower temperature than the brine adjacent header 20 and loops 15. In this manner the ice cream, for example, will be maintained colder in certain of said compartment 31 than in others. This feature of the invention has certain advantages in that it is desirable to maintain certain ice cream colder than others, for example, it is desirable to maintain brick ice cream colder than ice cream which is dipped from the compartment. By placing the brick ice cream in the square compartments 31, lying adjacent the tank 10 and loops 15, it will be maintained colder than the ice cream in other compartments.

The compartment 32 is adapted to contain the compressor mechanism which supplies the liquid refrigerant to the cooling unit through duct 11 and receives the refrigerant vapor therefrom through the duct 12. The construction of this compressor mechanism forms no part of the present invention and hence is not shown or described herein.

It will be clear from viewing Fig. 1 that for ice cream cabinets having only one row of ice cream containers 31 the extension header 20 would be dispensed with, since in that case the cabinet would be only about half as wide as the double row cabinet shown.

While the form of embodiment of the present invention as herein disclosed, constitutes a preferred form, it is to be understood that other forms might be adopted, all coming within the scope of the claims which follow.

What is claimed is as follows:

1. A cooling unit for mechanical refrigerators comprising: a tank adapted to contain liquid refrigerant at a constant level therein, a series of duct loops depending therefrom, an extension header connected to an end wall of said tank below the liquid level therein and extending longitudinally beyond said tank, and a second series of duct loops depending from said header.

2. A cooling unit for mechanical refrigerators comprising: a liquid refrigerant tank having mechanism therein for maintaining a constant liquid level, refrigerant inlet and outlet ducts connected thereto, a series of duct loops connected to said tank, an extension header of smaller cross-section than said tank and connected to an end wall thereof, and a second series of duct loops connected to said header.

3. A cooling unit for mechanical refrigerators comprising: a liquid refrigerant tank having mechanism therein for maintaining a constant liquid level, refrigerant inlet and outlet ducts connected thereto, a series of duct loops connected to said tank, a header pipe rigidly connected to an end wall of said tank below the liquid level therein, and a second series of duct loops connected to said header pipe.

4. A cooling unit for mechanical refrigerators comprising: a tank adapted to contain liquid refrigerant, an extension header connected to an end wall of said tank below the liquid level therein and adapted to receive refrigerant therefrom, said header extending longitudinally beyond said tank, and a series of duct loops connected with said header.

5. A refrigerator comprising a plurality of compartments, means for cooling said compartments to different temperatures respectively including a cooling unit disposed adjacent said compartments, said cooling unit including tank means adapted to contain a constant quantity of liquid refrigerant, the portion of the unit adjacent one of said compartments having a greater heat exchange area than the portion of the unit lying adjacent another compartment.

6. A refrigerator comprising a cabinet, a tank within said cabinet adapted to contain a cooling medium, a plurality of compartments extending into said cooling medium and means for cooling said compartments to different temperatures respectively including a cooling unit disposed adjacent said compartments, the portion of the unit adjacent one of said compartments having a greater heat exchange area than the portion of the unit lying adjacent another compartment.

7. A refrigerator comprising a cabinet, a tank within said cabinet adapted to contain a cooling medium, a plurality of pairs of food compartments extending into said cooling medium and means for cooling certain pairs of said compartments to different temperatures respectively including a cooling unit extending between a plurality of pairs of said compartments, the portion of the unit adjacent certain pairs having a greater heat exchanging area than portion adjacent other pairs.

In testimony whereof I hereto affix my signature.

JESSE G. KING.